United States Patent [19]
Balsells

[11] Patent Number: 5,575,487
[45] Date of Patent: Nov. 19, 1996

[54] CIRCULAR TAPERED RING FOR STATIC SEALING UNDER CONDITIONS OF HIGH PRESSURE

[75] Inventor: Peter J. Balsells, Santa Ana, Calif.

[73] Assignee: Bal Seal Engineering Company, Inc., Santa Ana, Calif.

[21] Appl. No.: 372,967

[22] Filed: Jan. 17, 1995

[51] Int. Cl.$^6$ .................................................. F16J 15/10
[52] U.S. Cl. .................................... 277/169; 277/170
[58] Field of Search ................................ 277/115, 236, 277/145, 169, 170, 168

[56] References Cited

U.S. PATENT DOCUMENTS

| | | | |
|---|---|---|---|
| 3,682,489 | 8/1972 | Fischer | 277/236 |
| 4,228,917 | 10/1983 | Sowell | 277/170 |
| 4,408,771 | 10/1983 | Shelton | 277/236 |
| 4,468,041 | 8/1984 | Yoshimura et al. | 277/144 |
| 4,491,332 | 1/1985 | Zumbusch | 277/152 |
| 4,550,921 | 11/1985 | Smith | 277/236 |
| 4,583,748 | 4/1986 | Weichenrieder, Sr. | 277/81 |
| 4,850,521 | 7/1989 | Servant | 277/236 |
| 5,118,119 | 6/1992 | Ditlinger | 277/170 |
| 5,143,382 | 9/1992 | Maringer | 277/29 |
| 5,213,343 | 5/1993 | White, Jr. | 277/152 |
| 5,263,683 | 11/1993 | Wong | 251/145 |
| 5,328,177 | 7/1994 | Lair et al. | 277/1 |
| 5,332,233 | 7/1994 | Futa, Jr. et al. | 277/27 |

FOREIGN PATENT DOCUMENTS

| | | | |
|---|---|---|---|
| 130503 | 12/1928 | Switzerland | 277/236 |

Primary Examiner—William A. Cuchlinski, Jr.
Assistant Examiner—John L. Beres
Attorney, Agent, or Firm—Walter A. Hackler

[57] ABSTRACT

Circular ring apparatus for static sealing includes a circular ring seat having a shoulder with a flat surface of revolution disposed at an acute angle to a center line of the seat and subtending, through an arcuate surface, a seat bottom disposed at a right angle to the ring seat center line along with a sealing ring having an exterior surface of revolution disposed at an acute angle to a center line of the sealing ring, the sealing ring exterior surface acute angle being different from the ring seat flat surface acute angle. The sealing ring has a height, measured along the sealing ring center line, different than a height of the ring seat, measured along the ring seat center line, and a ring seat assembled position with the ring seat in which the sealing ring center line and the ring seat center line are coaxial, the sealing ring exterior surface abuts the ring seat shoulder and a portion of the sealing ring exterior surface abuts the ring seat arcuate surface and ring seat bottom.

6 Claims, 2 Drawing Sheets

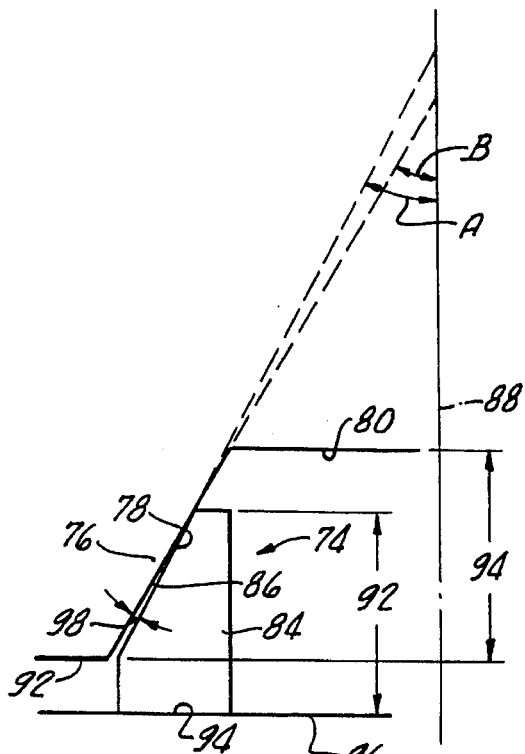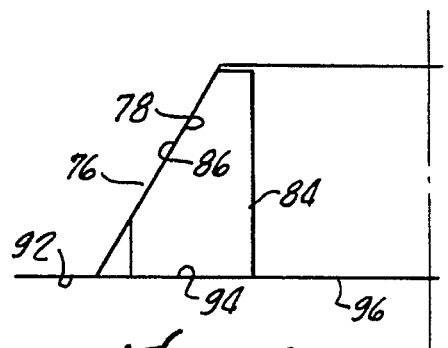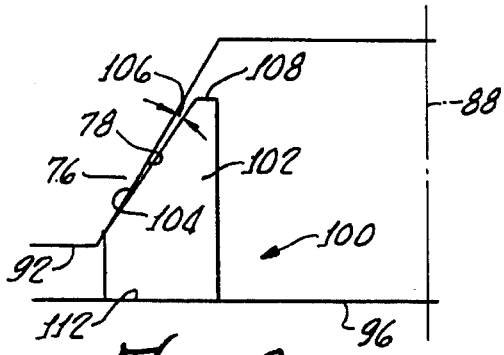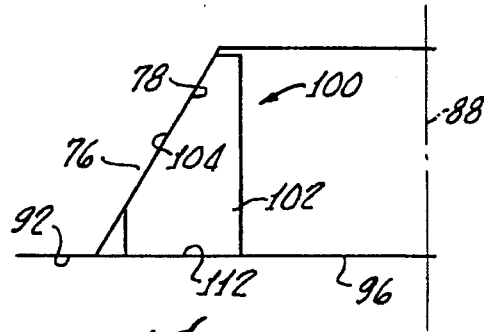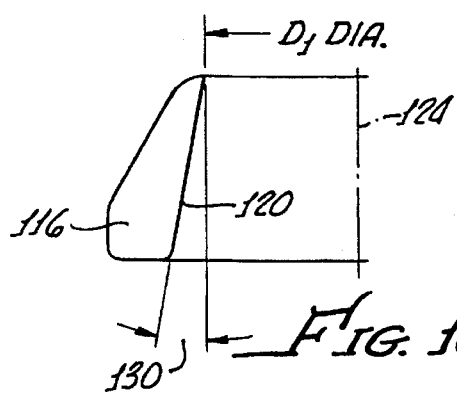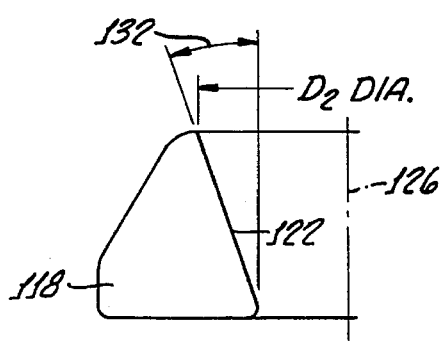

CIRCULAR TAPERED RING FOR STATIC SEALING UNDER CONDITIONS OF HIGH PRESSURE

The present invention generally relates to the sealing of fluids or gases and is more particularly directed to a circular tapered ring which is shaped and assembled to bring the tapered portion of the ring into intimate contact with the mating housing upon the application with axial force.

In conditions of particularly high pressure, for example, gases up to 15,000 psi and liquids up to 25,000 psi, sealed materials tend to cold flow and therefore it is necessary that the seal is able to remain stable without extrusion thereof.

It is also desirable for the seal to prevent leakage from pressures ranging from vacuum to the desired high pressure. Over a range of pressure, there is a tendency for mating sealed parts to expand to separate. Accordingly, the seal must be able to accommodate such variations without leakage therepast.

To provide adequate sealing, a minimum sealing stress must be provided along the sealing surfaces to effect adequate sealing. This sealing stress is determined by the load applied in the area of contact between the mating parts. Therefore, a sealing ring must provide adequate deflection so that under extreme conditions, the sealing stress is maintained.

Heretofore, tapered backed rings have been used as a support for soft seals to prevent extrusion of the soft seals by closing a gap between a loading plate and a backup plate. In this situation, the soft seal provides a sealing of the back of ring and acts as an anti-extrusion device.

The present invention eliminates the need for a soft seal because the ring itself provides adequate sealing.

SUMMARY OF THE INVENTION

Circular ring apparatus, in accordance with the present invention, for static sealing includes a circular ring seat having a shoulder with a flat surface of revolution disposed at an acute angle to a center line of the seat and subtending, through an arcuate surface, a seat bottom disposed at a right angle to the ring seat center line.

A sealing ring is provided which includes an exterior surface of revolution disposed at an acute angle to a center line sealing ring. In order to provide improved sealing, the sealing ring exterior surface acute angle is either larger or smaller than the ring seat flat surface acute angle and provides control of mating of the sealing ring and ring seat upon load.

The sealing ring has a height, measured along the sealing ring center line, which is greater than the height of the ring seat, measured along the ring seat center line, so that in a ring seat assembled position, in which the center lines are coaxial, the sealing ring exterior surface abuts the ring seat shoulder; and a portion of the sealing ring exterior surface abuts the ring seat arcuate surface and the ring seat bottom.

Upon assembly, the tops of the sealing ring and the ring seat are flush with one another.

In another embodiment of the present invention, the height of the sealing ring, measured along the sealing ring center line, is less than the height of the ring seat, measured along the ring seat center line. In this instance, the sealing ring exterior surface abuts only the ring seat shoulder.

In addition, a cross-sectional area of the sealing ring may be controlled by varying an angle between the centerline of the ring and an inside diameter of the ring. This, in turn, enables control of sealing forces between the ring exterior surface and the ring seat arcuate surface and the ring seat bottom in the assembled position.

BRIEF DESCRIPTION OF THE DRAWINGS

The advantages and features of the present invention will be better understood by the following description when considered in conjunction with the accompanying drawings in which:

FIG. 6 is an enlarged representation of the sealing ring, in accordance with the present invention, showing an angular difference, with respect to a center line, of a flat surface on the ring seat and exterior surface on the sealing ring;

FIG. 7 shows the sealing ring and ring seat of FIG. 6 in assembled position;

FIG. 8 is similar to FIG. 6, showing a flat surface on the ring seat having a smaller acute angle with a center line than the exterior surface of the sealing ring;

FIG. 9 is a drawing showing the ring seat and ring seal of FIG. 8 in an assembled position; and FIGS. 10 and 11 are a cross-sectional views of a sealing ring in accordance with the present invention showing an angular relationship of an inside diameter of the ring with a centerline which provides control over sealing forces by changing a cross-section of the ring.

DETAILED DESCRIPTION

Figure 1:
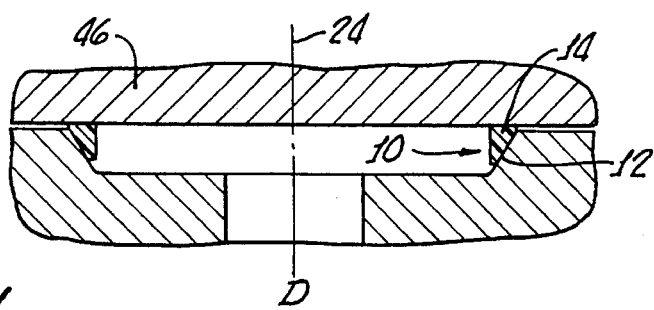
FIG. 1 is a cross-sectional view of a sealing ring, in accordance with the present invention, disposed against a ring seat before seating thereagainst by a loaded member.

Turning now to FIG. 1 there is shown in cross-section, circular ring sealing apparatus 10 which includes a circular ring seat 12 and a sealing ring 14 with an inside diameter D, of the sealing ring 14, which may be about 0.6 inches. However, it should be appreciated that the dimensions of the sealing ring 14 and ring seat 12, which includes the diameter D, may be of any suitable size, while still following the teachings of the present invention.

Figure 2:
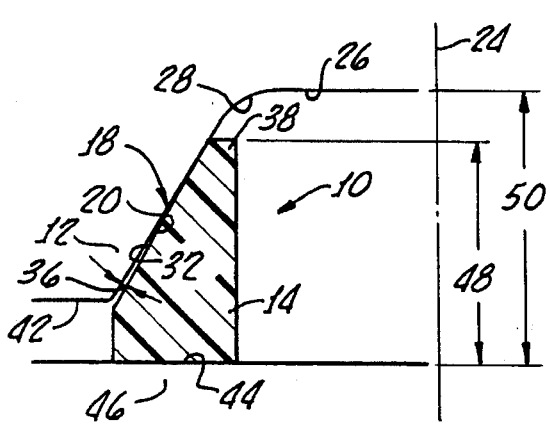
FIG. 2 is an enlarged view of one embodiment of the present invention in which the ring seat includes an arcuate portion and a flat portion having an angle with a center line greater than the angle of the exterior surface of the sealing ring.
Figure 3:
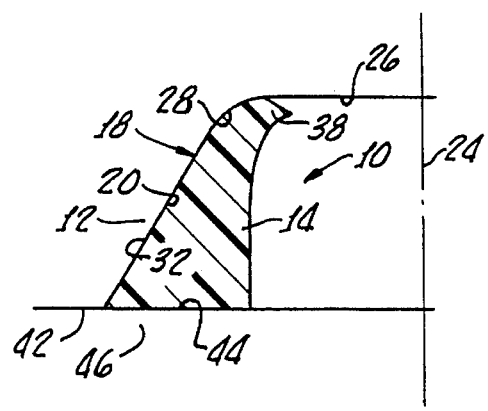
FIG. 3 is a view of the sealing ring and sealing seat shown in FIG. 2 in a sealing position, showing the contact between the sealing ring and the arcuate portion of the sealing seat.

The ring seat 12 and sealing ring 14 may be formed from any suitable material such as plastic or metal, as will be hereinafter discussed in greater detail. As shown in FIGS. 2–3, the ring seat 12 includes a shoulder 18 having a flat surface 20 disposed at an acute angle (to a center line 24) which subtends a seat bottom 26 through an arcuate surface 28.

Sealing ring 14 includes an exterior surface 32 which is also disposed at an acute angle to the center line 24. As shown in FIG. 2, the acute angle of the exterior surface 32 is smaller than the acute angle of the flat portion 20 of the shoulder 18, and the angular difference may be up to approximately 1°. This provides for a gap 36 between the seat 12 and the ring 14 before loading thereof when a narrow portion 38 of the ring 14 is in contact with the flat surface 18 of the seat shoulder 20.

It should be appreciated that the seat 12 and the ring 14 have a common, or coaxial, center line 24 when assembled. Upon loading of the ring 14 by a plate 46, a top 42 of the seat and a top of the ring 44 are flush, as shown in FIG. 3.

Turning back to FIG. 2, the ring 14 has a height 48 which is greater than a height 50 of the ring seat 12. These dimensions provide for a ring seat assembled position, as shown in FIG. 3, in which the sealing ring exterior surface 32 abuts the ring seat shoulder 20 along a flat portion 18 and also along the arcuate surface 28, as well as the seat bottom 26.

By providing a sealing height 48, which is greater than the height 50 of the ring seat, an axial force is supplied at both ends of the sealing ring 14 which, as shown in FIG. 3, causes the sealing ring 14 to curve inwardly and create a spring action to enhance intimate contact between the sealing ring and the arcuate surface 28 and seat bottom 26 which substantially improves sealing reliability.

Figure 4:
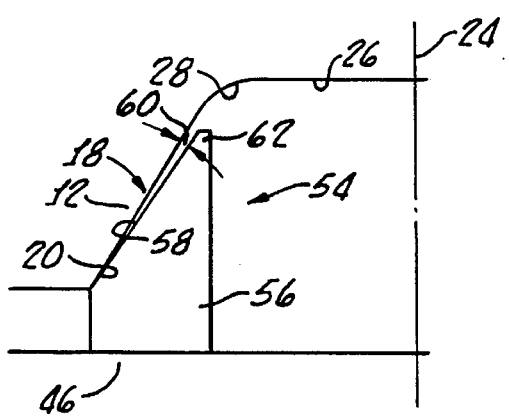
FIG. 4 is similar to FIG. 2 with an angle of the flat surface of the ring seat being smaller than the angle of the exterior surface of the sealing ring to the center line.
Figure 5:
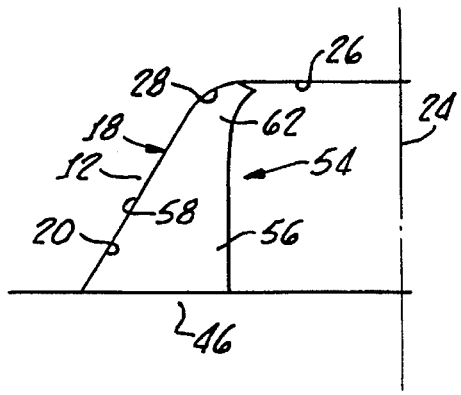
FIG. 5 is a view of the ring seat and sealing ring shown in FIG. 4 in an assembled position.

In FIGS. 4 and 5, there is shown an alternative embodiment 54 of the present invention, which utilizes the ring seat 12 but with a sealing ring 56 having an exterior surface 58 disposed at an angle greater than the angle of the flat portion 18 of the seat 12. This provides for a gap 60 at a narrow portion 68 of the ring 56.

FIGS. 6 and 7 show an alternative embodiment 74 of a circular ring apparatus for static sealing which includes a circular ring seat 76 having a flat shoulder 78 subtending a bottom 80 and a sealing ring 84.

As shown most clearly in FIG. 6, the sealing ring 84 has an exterior surface 86 acute angle A which is smaller than an acute angle B at which the shoulder 76 is disposed with respect to a center line 88. The ring 84 has a height 92 which is less than a height 94 of the seat 76 which provides, upon assembly (as shown in FIG. 7), intimate contact with the sealing ring 84 exterior surface 86 and the shoulder 78 of the seat 76. Complete sealing occurs when a top 92 of the seat 76 is flush with a top 94 of the sealing ring 84 (as shown in FIG. 7) when the plate 96 loads the ring 84 against the seat 76. Upon such loading, a gap 98 between the exterior surface 76 and the shoulder 78 proximate the top 92 of the seat 76 is closed.

Turning now to FIGS. 8 and 9, there is shown yet another embodiment 100 in accordance with the present invention in which a sealing ring 102 includes an exterior surface 104 which is disposed at an angle greater than that of the angle of the shoulder 78 with the center line 88, which provides for a gap 106 proximate the narrow end 108 of the ring 102. FIG. 9 shows the assembled apparatus 100. A top 112 with a sealing ring 102 is flush with the top 92 of the seat 76, thereby providing an intimate and abutting relationship between the exterior surface 104 of the sealing ring and the shoulder 78 of the seat 76.

With reference to FIGS. 10 and 11, the force and flexibility of a sealing ring 116, 118 is affected by the circular ring cross-section, which can be modified by the inside diameter $D_1$, $D_2$ of the circular ring 116, 118 and the surface 120, 122 of such inside diameter, which can be parallel or angular to the centerline 124, 126.

By modifying the angle 130 (See FIG. 10), the ring 116 cross-sectional area will be reduced, which will provide lower force and greater flexibility. By modifying the angle 132 (See FIG. 11), the ring 188 develops greater contact area and higher force upon loading of the ring 118. This also results in lesser flexibility. the force developed affects the sealing stress and the sealing ability. A higher force produced higher sealing stress and generally better sealing ability.

Variation of the angles 130, 132 enables control over seal flexibility and force required to compress the seal. In addition, controlling the cross-section can be used in combination with the material of construction and surface finish of the mating parts. For example, in soft materials, a decrease on the force required to compress the seal may be desirable. On the other hand, in hard materials greater force may be needed to affect sealing.

Although there has been hereinabove described a specific arrangements of circular ring apparatus in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

Control of the sealing force is also important in seal reusability, i.e., the ability to reuse the metal rings and still provide adequate sealing. If stress concentration is very high, there will be tendency to indent the seat creating a groove or indentation (not shown). Depending on the depth of such groove, the ability to reseal varies, and the sealing ability also varies. Naturally, the deeper the indentation, the greater the possibility of leakage.

What is claimed is:

1. Circular ring apparatus for static sealing comprising:

a circular ring seat having a shoulder with a flat surface of revolution disposed at an acute angle to a center line of the seat and subtending, through an arcuate surface, a seat bottom disposed at a right angle to the ring seat center line; and a sealing ring having an exterior surface of revolution disposed at an acute angle to a center line of the sealing ring and an interior surface of resolution disposed parallel to the sealing ring center line, the sealing ring exterior surface acute angle being different from the ring seat flat surface acute angle, said sealing ring having a height, measured along the sealing ring center line, greater than a height of the ring seat, measured along the ring seat center line, and a ring seat assembled position with the ring seat in which the sealing ring center line and the ring seat center line are coaxial, the sealing ring exterior surface abuts the ring seat shoulder and a portion of the sealing ring exterior surface abuts the ring seat arcuate surface and ring seat bottom and the sealing ring interior surface is unsupported.

2. The circular ring apparatus according to claim 1 wherein the sealing ring and ring seat each have a top and in the assembled position, the sealing ring top and ring seat top are flush with one another.

3. The circular ring apparatus according to claim 2 wherein the ring seat flat surface acute angle is smaller than the sealing ring exterior surface acute angle.

4. The circular ring apparatus according to claim 3 wherein the ring seat flat surface acute angle is up to about 1° smaller than the sealing ring exterior surface acute angle.

5. Circular ring apparatus for static sealing comprising:

a circular ring seat having a shoulder with a flat surface of revolution disposed at an acute angle to a center line of the seat and subtending, through an arcuate surface, a seat bottom disposed at a right angle to the ring seat center line;

a sealing ring having an exterior surface of revolution disposed at an acute angle to a center line of the sealing ring and an interim surface of revolution, the sealing ring exterior surface acute angle being different from the ring seat flat surface acute angle, said sealing ring having a height, measured along the sealing ring center line, greater than a height of the ring seat, measured along the ring seat center line, and a ring seat assembled position with the ring seat in which the sealing ring center line and the ring seat center line are coaxial, the sealing ring exterior surface abuts the ring seat shoulder and a portion of the sealing ring exterior surface abuts the ring seat arcuate surface and ring seat bottom and the sealing ring interior surface is unsupported, said sealing ring and ring seat each having a top and in the assembled position, the sealing ring top and ring seat are flush with one another; and means, defining a cross section of the sealing ring, for controlling a force developed between the circular ring exterior surface and the ring seat arcuate surface and the ring seat bottom in the assembled position.

6. The circular ring apparatus according to claim 5 wherein the ring seat flat surface acute angle is smaller than the sealing ring exterior surface acute angle.

* * * * *